United States Patent
Mukherjee et al.

(10) Patent No.: US 8,139,521 B2
(45) Date of Patent: Mar. 20, 2012

(54) WIRELESS NODES WITH ACTIVE AUTHENTICATION AND ASSOCIATED METHODS

(75) Inventors: Rajat Pritam Mukherjee, Montreal (CA); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 362 days.

(21) Appl. No.: 11/553,293

(22) Filed: Oct. 26, 2006

(65) Prior Publication Data
US 2007/0097904 A1    May 3, 2007

Related U.S. Application Data

(60) Provisional application No. 60/731,070, filed on Oct. 28, 2005.

(51) Int. Cl.
*H04W 4/00* (2009.01)
(52) U.S. Cl. ............... 370/328; 370/395.2; 370/395.52; 370/338; 713/168
(58) Field of Classification Search .............. 370/331, 370/338, 328, 401, 389; 455/422, 436, 435, 455/432, 424, 442; 709/229, 228; 726/3; 713/168
See application file for complete search history.

(56) References Cited

U.S. PATENT DOCUMENTS

| | | | |
|---|---|---|---|
| 5,351,295 A | 9/1994 | Perlman et al. | 380/23 |
| 6,230,022 B1 * | 5/2001 | Sakoda et al. | 455/522 |
| 6,775,657 B1 | 8/2004 | Baker | 706/45 |
| 7,120,136 B2 | 10/2006 | Upp et al. | 370/331 |
| 2002/0085719 A1 * | 7/2002 | Crosbie | 380/248 |
| 2003/0051140 A1 * | 3/2003 | Buddhikot et al. | 713/169 |
| 2003/0087629 A1 * | 5/2003 | Juitt et al. | 455/411 |
| 2003/0232598 A1 * | 12/2003 | Aljadeff et al. | 455/41.2 |
| 2004/0077335 A1 * | 4/2004 | Lee et al. | 455/410 |
| 2004/0198220 A1 * | 10/2004 | Whelan et al. | 455/41.1 |
| 2004/0243846 A1 * | 12/2004 | Aboba et al. | 713/201 |
| 2005/0021979 A1 * | 1/2005 | Wiedmann et al. | 713/182 |
| 2005/0030929 A1 * | 2/2005 | Swier et al. | 370/338 |
| 2005/0144544 A1 * | 6/2005 | Gariador et al. | 714/724 |
| 2005/0163078 A1 * | 7/2005 | Oba et al. | 370/331 |
| 2005/0177723 A1 * | 8/2005 | Huang et al. | 713/168 |
| 2005/0213579 A1 * | 9/2005 | Iyer et al. | 370/395.2 |
| 2005/0259657 A1 * | 11/2005 | Gassoway | 370/392 |
| 2006/0094400 A1 * | 5/2006 | Beachem et al. | 455/410 |
| 2006/0099929 A1 * | 5/2006 | Frank et al. | 455/411 |
| 2006/0161983 A1 * | 7/2006 | Cothrell et al. | 726/23 |
| 2006/0173781 A1 * | 8/2006 | Donner | 705/50 |
| 2006/0259759 A1 * | 11/2006 | Maino et al. | 713/151 |
| 2006/0294379 A1 * | 12/2006 | Ishidoshiro | 713/171 |
| 2007/0038866 A1 * | 2/2007 | Bardsley et al. | 713/182 |
| 2008/0043686 A1 * | 2/2008 | Sperti et al. | 370/338 |
| 2008/0127320 A1 * | 5/2008 | De Lutiis et al. | 726/9 |

\* cited by examiner

*Primary Examiner* — Nick Corsaro
*Assistant Examiner* — Mahendra Patel
(74) *Attorney, Agent, or Firm* — Allen, Dyer, Doppelt, Milbrath & Gilchrist, P.A.

(57) ABSTRACT

A wireless communications network includes access points and wireless nodes. Each access point and each wireless node has a respective authentication token and address associated therewith. The access points and wireless nodes communicate using packets, where each packet includes an authentication token, an origination address and a destination address. During the communications, the access points read and store the respective authentication tokens and origination addresses in the packets wirelessly transmitted from the wireless nodes for defining an allowed wireless node list. Likewise, each wireless node reads and stores the respective authentication tokens and origination addresses wirelessly transmitted from the access points for defining an allowed access point list. The wireless nodes and access points do not associate with an attacker if both an authentication token and an address associated with the attacker are not on the respective allowed access point and wireless node lists.

26 Claims, 4 Drawing Sheets

US 8,139,521 B2

WIRELESS NODES WITH ACTIVE AUTHENTICATION AND ASSOCIATED METHODS

RELATED APPLICATION

This application claims the benefit of U.S. Provisional Application Ser. No. 60/731,070 filed Oct. 28, 2005, the entire contents of which are incorporated herein by reference.

FIELD OF THE INVENTION

The present invention relates to the field of wireless communication systems, and more particularly, to preventing impersonating attacks on a wireless node operating in an authenticated network.

BACKGROUND OF THE INVENTION

Wireless systems have long suffered from man-in-the-middle, session hijacking and other similar attacks that rely on the ability to impersonate a legitimate party. Approaches so far have focused on better authentication and key distribution schemes. These approaches have little to do with detecting an attack, and will always have vulnerability, namely theft of identity.

Currently, an attacker who wishes to impersonate a node (client or access point) in an authenticated network (802.1x or PSK) somehow steals their authentication credentials (e.g., PSK, private keys, certificates, etc.) and then uses it for their authentication. While impersonating a node, the attacker may or may not choose to use the MAC address of the node being impersonated.

The 802.11 protocol is designed in a manner such that all nodes receive all packets that are transmitted. Each node then proceeds to read the destination MAC address of every packet. If the destination MAC address corresponds to their own MAC address, the node proceeds to read the contents of the packet. Otherwise, the node discards the packet. This results in several problems. One problem is that the MAC address, even though it acts to authenticate hardware, is not used for authentication.

Security companies in the security market have developed sensors that monitor for multiple transmissions using the same MAC addresses from different locations. While these sensors are useful, they are typically expensive and result in additional hardware being added to the nodes.

SUMMARY OF THE INVENTION

In view of the foregoing background, it is therefore an object of the present invention to prevent impersonating attacks on a wireless node without requiring additional hardware for the node.

This and other objects, features, and advantages in accordance with the present invention are provided by a wireless communications network comprising at least one access point, and a plurality of wireless nodes for communicating with the at least one access point. Each access point and wireless node has a respective authentication token and address associated therewith.

The access point and wireless nodes may communicate using packets. Each packet may comprise an authentication token, an origination address and a destination address. During the communicating, each access point may read and store the respective authentication tokens and origination addresses wirelessly transmitted from the wireless nodes for defining an allowed wireless node list. Likewise, each wireless node may read and store the respective authentication tokens and origination addresses wirelessly transmitted from each access point for defining an allowed access point list.

Each wireless node does not associate with any one of the access points if both an authentication token and an address for that access point are not on the allowed access point list. Each access point also does not associate with anyone of the wireless nodes if both an authentication token and an address for that wireless node are not on the allowed wireless node list.

An advantage of the present invention is that wireless nodes actively deal with attackers trying to impersonate an access point, and access points actively deal with attackers trying to impersonate a wireless node. This gain in security is achieved with relatively minor modifications to the software and middleware of network cards of wireless products The wireless nodes and access points read an additional field, i.e., the originating address. Moreover, complicated sensor installations are not required to provide this gain in security.

Each access point may monitor packets being wirelessly transmitted within the wireless communications network by reading the originating addresses of each transmitted packet. If a read origination address matches the address of the access point, and the access point did not transmit the packet, then a determination is made that an attacker is impersonating the access point If an attacker is impersonating the access point, several actions may be taken by the access point. The access point may switch to another communications channel, transmit a warning message by increasing its transmits power to drown out transmission by the attacker, or notify a network administrator.

If an attacker is impersonating a wireless node, several actions may be taken by the wireless node. The wireless node may switch to another communications channel, transmit a warning message by increasing its transmits power to drown out transmission by the attacker, or notify a network administrator.

Each access point may have identifying information associated therewith, and when one of the wireless nodes is associating with the access point, the wireless node may display the identifying information to a user of the wireless node. The identifying information may correspond to the authentication token of the access point. If a user of a wireless node is operating in another wireless communications network, for example, and an attacker is using an authentication token and address from the approved list of access points, the identifying information helps to notify the user that an attacker is impersonating an access point that is in a different location.

The wireless communications network may further comprise an authentication server coupled to each access point so that the wireless communications network is configured as an authenticated network. The access points and wireless nodes are operating based upon a PSK protocol or an 802.1x protocol. The addresses may comprise MAC addresses Another aspect of the present invention is directed to a method for detecting impersonating attacks in a wireless communications network as defined above. The method may comprise wirelessly transmitting packets from the access points to the wireless nodes, where each packet may comprise an authentication token, an origination address and a destination address Each wireless node may read and store the respective authentication tokens and origination addresses of each access point for defining an allowed access point list. Each wireless node wirelessly transmits packets to the access points, where each packet may comprise an authentication token, an origination address and a destination address. Each access point may read and store the respective authentication tokens and origination addresses of the wireless nodes for defining an allowed wireless node list.

The wireless nodes do not associate with an access point if both an authentication token and an address associated therewith are not on the allowed access point list, and the access points do not associate with a wireless node if both an authentication token and an address associated therewith are not on the allowed wireless node list.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
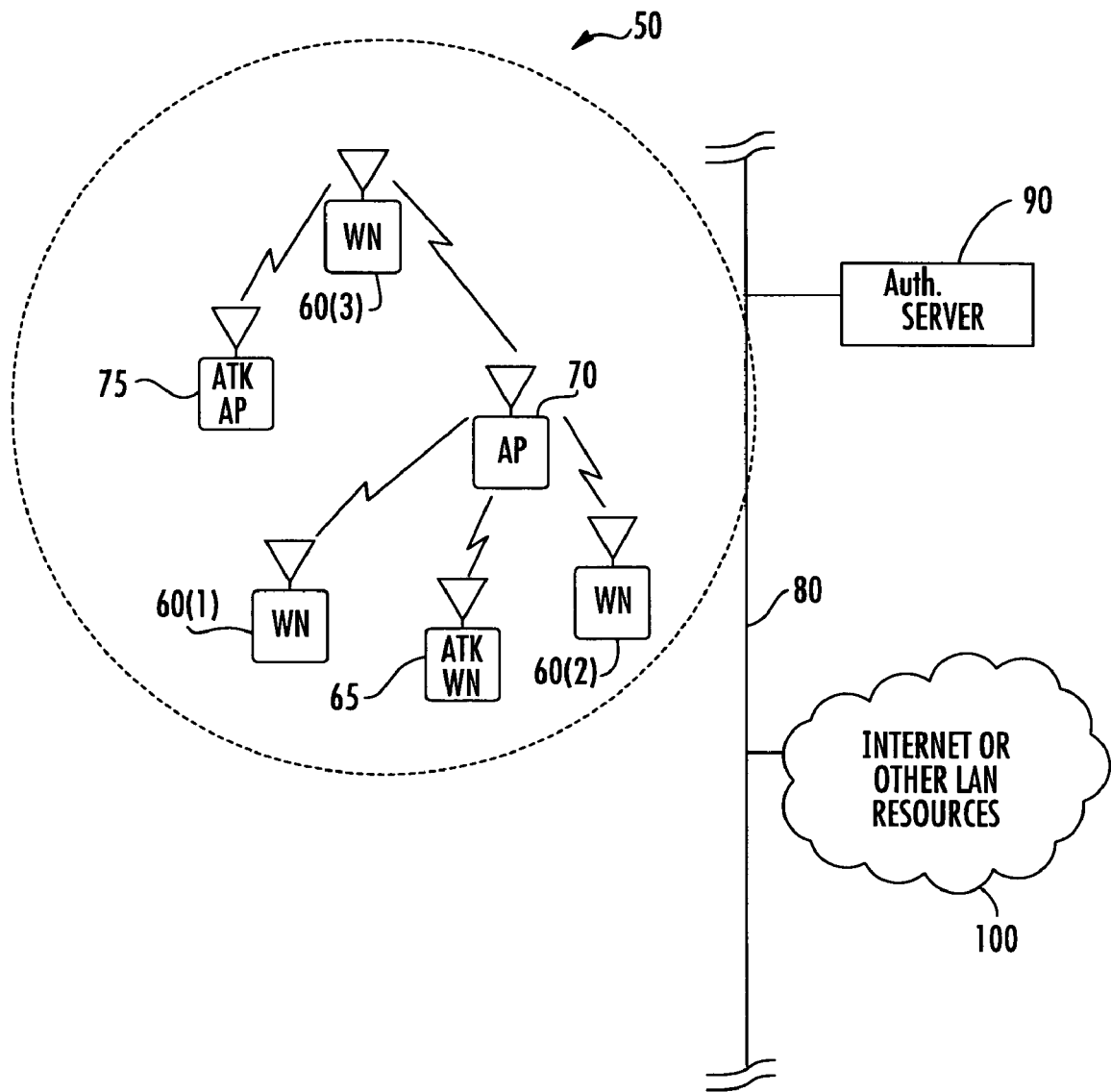
FIG. 1 is a schematic diagram of a wireless communications network including wireless nodes and access points operating with active authentication in accordance with the present invention.

Referring initially to FIG. 1, a schematic diagram of a wireless communications network 50 including wireless nodes 60(1)-60(3) and an access point 70 operating with active authentication will be discussed. Even though only one access point 70 is illustrated, the wireless communication network 50 may include more than one access point. In the following description, when a general reference is made to the wireless nodes, reference numeral 60 may be used. The access point 70 is connected to a distribution system via a wired connection 80. Connected to the distribution system is an authentication server 90 so that the wireless communications network 50 is an authenticated network.

When a wireless node 60 connects to the distribution system, a user name and authentication token (e.g., a password) is entered. This information is passed to the authentication server 90. The authentication server 90 checks that the information is correct. Also connected to the distribution system is the Internet or other LAN resources 100. The access point 70 and the wireless nodes 60 operate based upon a PSK or 802.1x protocol, for example.

As will be discussed in greater detail below, the access point 70 and each wireless node 60 have a respective authentication token and address associated therewith. The access point 70 and wireless nodes 60 communicate using packets. Each packet comprises an authentication token, an origination address and a destination address. The addresses may be MAC addresses, for example.

During the communicating, the access point 70 reads and stores the respective authentication tokens and origination addresses wirelessly transmitted from the wireless nodes 60 for defining an allowed wireless node list 72. Each wireless node 60 reads and stores the authentication token and origination address wirelessly transmitted from the access point 70 for defining an allowed access point list 62.

A wireless node 60 does not associate with an access point 70 if both an authentication token and an address for that access point are not on the allowed access point list 62. Similarly, an access point 70 does not associate with anyone of the wireless nodes 60 if both an authentication token and an address for that wireless node are not on the allowed wireless node list 72.

An advantage of the present invention is that wireless nodes 60 actively deal with an attacker 75 trying to impersonate an access point 70 by reading an additional field, i.e., the originating address, of the packets transmitted by the attacker. The access point 70 also actively deals with an attacker 65 trying to impersonate a wireless node 60 by reading the originating address of the packets transmitted by the attacker This gain in security is achieved with relatively minor modifications to the software and middleware of network cards in the wireless devices.

Figure 2:
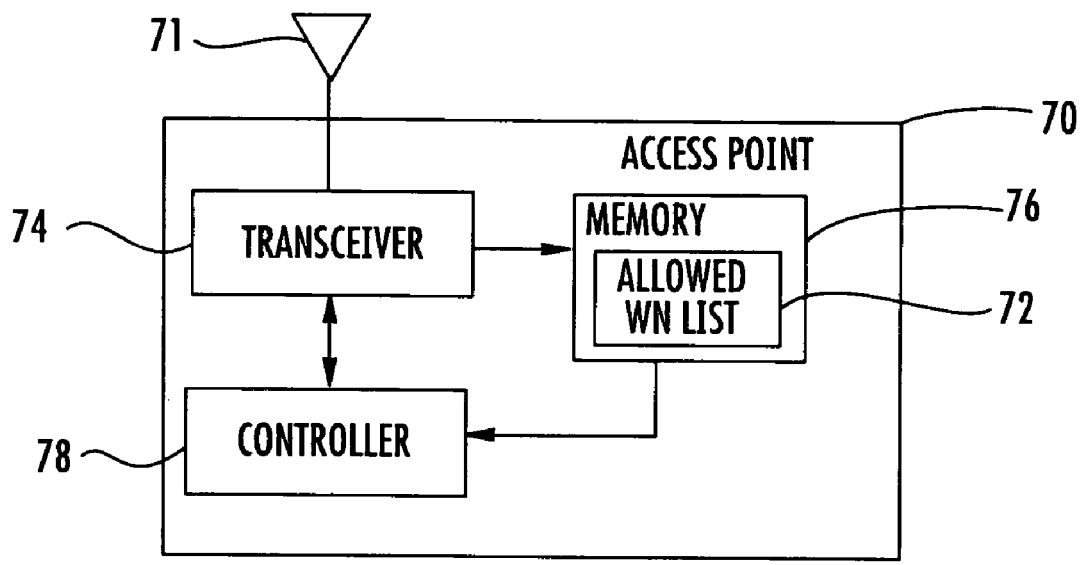
FIG. 2 is a block diagram of the access point illustrated in FIG. 1.
Figure 3:
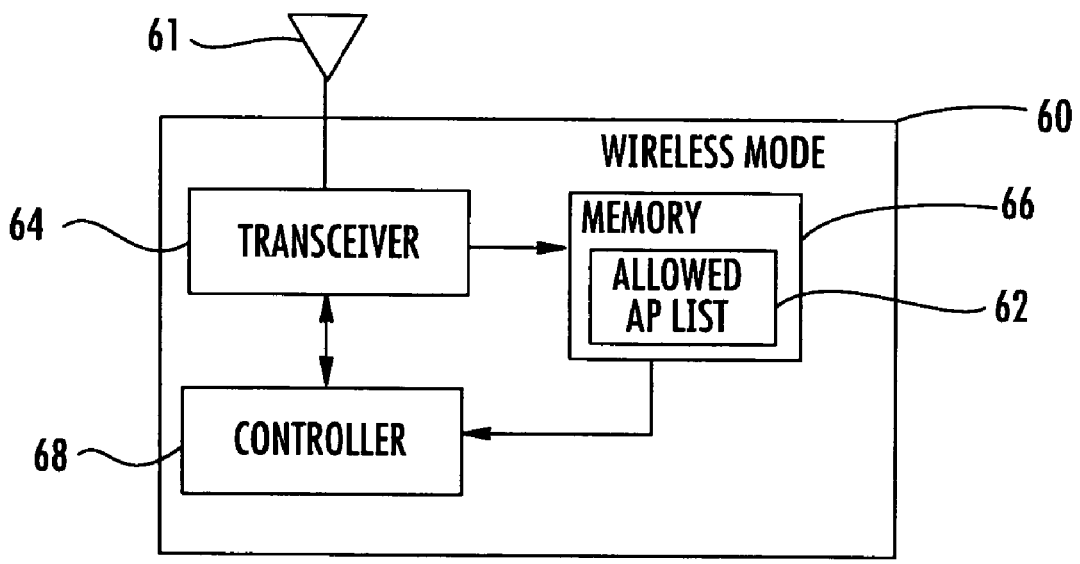
FIG. 3 is a block diagram of one of the wireless nodes illustrated in FIG. 1.

Block diagrams of the access point 70 and a wireless node 60 will now be discussed in reference to FIGS. 2 and 3. The access point 70 includes an antenna 71, and a transceiver 74 coupled to the antenna. When the access point 70 receives packets from the wireless nodes 60, the respective authentication tokens and origination addresses for each respective wireless node 60 are stored in a memory 76 coupled to the transceiver 74. The respective authentication tokens and origination addresses are used to define the allowed wireless node list 72 that is also stored in the memory 76. A controller 78 is coupled to the memory 76 and transceiver 74. The controller 78 causes the transceiver 74 not to associate with a wireless node 65 if both an authentication token and an address for that wireless node are not on the allowed wireless node list. This wireless node 65 is an attacker or impersonating node.

Similarly, each wireless node 60 includes an antenna 61, transceiver 64, a memory and a controller 68. When the wireless node 60 receives packets from the access point 70, the respective authentication tokens and origination addresses for the access point are stored in the memory 66 coupled to the transceiver 64. An antenna 61 is coupled to the transceiver 64. The respective authentication tokens and origination addresses are used to define the allowed access point list 62 that is also stored in the memory 66. The controller 68 causes the transceiver 64 not to associate with an access point 75 if both an authentication token and an address for that access point are not on the allowed access point list. This access point 75 is an attacker or impersonating access point.

As discussed above, the present invention is directed to detecting man-in-the-middle, session hijacking and other impersonation attacks on a wireless node 60 and an access point 70. Certain scenarios will now be discussed along with the requirements necessary to implement this concept A key feature of this concept requires wireless nodes (and access points) to read the originating MAC address of all packets they capture from the air—currently they read only the destination MAC address.

A first requirement is that all nodes 60, 70 cache the MAC address of its communicating partner along with the authenticating credential used by it. In office networks where there may be several access points with different MAC addresses using the same AAA authentication token, the MAC addresses of all allowed access points along with the authenticating token of the AAA server (in most cases the public key) be stored on all wireless nodes. The authentication tokens and MAC addresses of all clients are also stored on all access points. In other words, if node B (having, for example, a MAC address of 00-06-5B-15-04-B4 and an authenticating token joe_harry56) communicates with node A at some point in the past, node A will cache the MAC address 00-06-5B-15-04-B4 with joe_harry56.

A second requirement is that a node that caches addresses as defined above not associate with any node that uses an existing authenticating token with a different MAC address if the MAC address being used is not on the "allowed list." In the above example node A will not associate with node E if node E uses a MAC address of 01-00-5A-14-04-B4 with the authentication token joe_harry56 and the MAC address of node E is not in the "allowed list" of node A. The implicit understanding is that only certain access points are allowed.

A third requirement is that nodes read the originating MAC address of each packet they see transmitted over the air. If the node reads the originating MAC address and finds packets being transmitted (or even a single packet) using its MAC address then it knows that somebody is trying to impersonate him.

Knowing that somebody is trying to impersonate him a node can be passive and switch to another channel; be active and transmit a warning message (which may be proprietary) by momentarily increasing its transmit power to drown out the impersonating packets; or take a higher layer action (e.g., notifying the network administrator).

A fourth requirement to make the wireless communication system 50 more secure is by providing a higher layer security protocol that informs a wireless node 60 of some information about the node they are associating with For example, suppose at the time of configuration a particular SSID was configured to be the "finance_dept." Now every time the wireless node associates with a network that uses this SSID, a popup on the user's screen will ask the user if they are indeed inside the "finance department." If the user knows they are at a coffee shop (for example) they can then choose not to associate with this fake network that pretends to be the finance department.

The benefits for an enterprise network (when combining the above requirements) are as follows. Suppose an attacker steals the authentication credentials of an AAA server 90. They then try to use this credential to authenticate themselves to a wireless node 60. They will find that no wireless node belonging to the network 50 will be willing to associate with them if their MAC address does not match that of an allowed access point 70 (i.e., the MAC addresses of the office access points). This is a consequence of the first and second requirements.

If they try to fake their MAC address so that it matches that of an office access point 70 and they try to associate with the wireless node 60 when the wireless node is actually in the office, the legitimate access point 70 will be able to hear his MAC address being used and will then take appropriate action (e.g., send a warning message, alert administrator and so on). This is a consequence of the third requirement.

If they fake their MAC address so that it matches an office access point 70 and they try to associate with the wireless node 60 when the wireless node is out of the office, the wireless node will be prompted about their location and will choose not to associate with the attacker 65. This is a consequence of the fourth requirement. Thus an attacker with the credentials of the AAA server 90 cannot launch impersonation attacks.

Suppose now an attacker steals the authentication credentials of a wireless node 60. It is now much harder for him to use it because he has to use the MAC address of the client, otherwise the network 50 will not associate with the attacker 65. This is a consequence of the first and second requirements. The attacker 65 has to authenticate from a location where the legitimate wireless node 60 cannot hear his transmissions because otherwise the wireless node would trigger an alert. This is a consequence of the third requirement. Alternatively, the attacker 65 would have to attack at a time when the wireless node 60 is not in the office. Higher layer security features can be used to dissuade such attacks.

Figure 4:
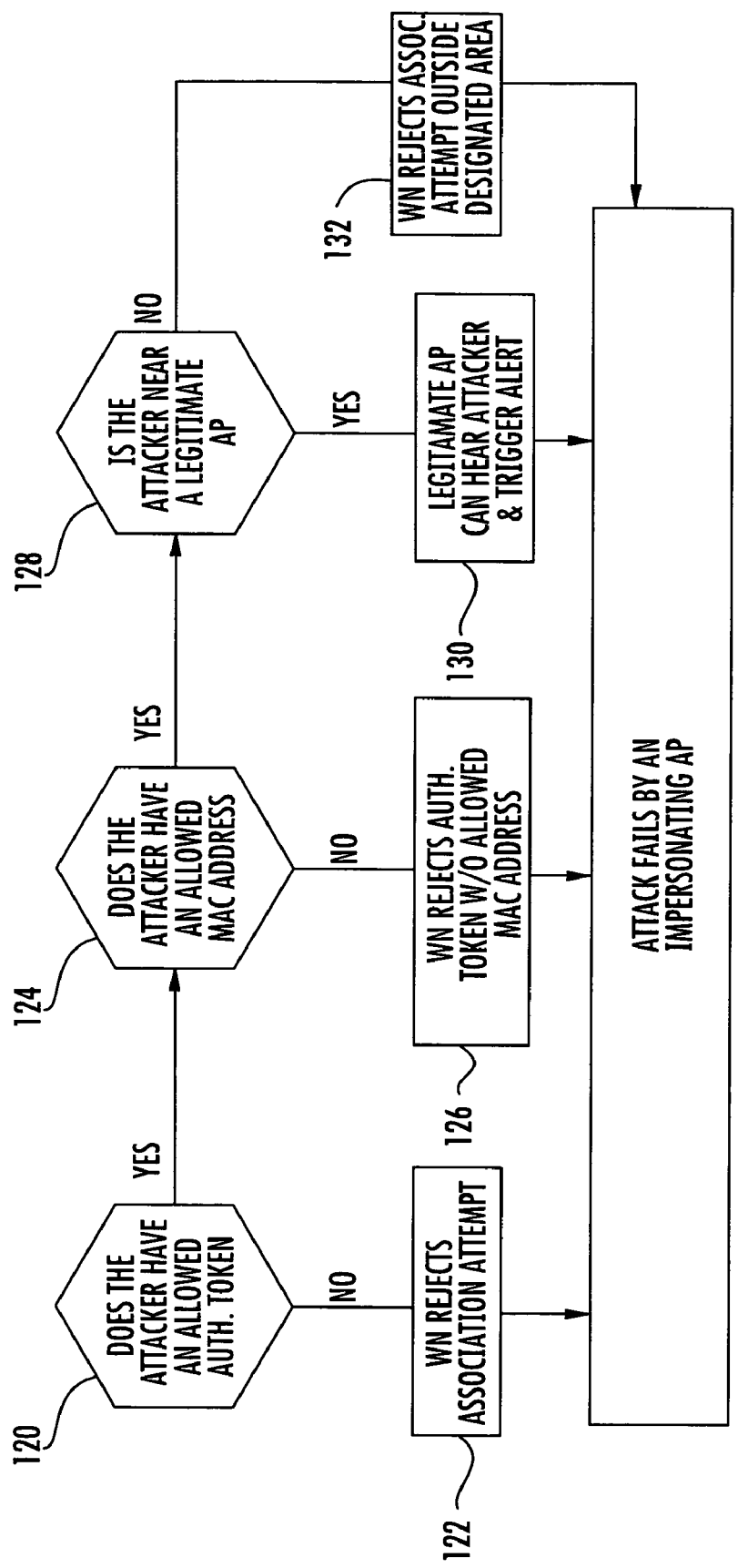
FIG. 4 a flow chart for preventing an attack on a wireless node by an attacker impersonating as an access point in accordance with the present invention.

The benefits for a home wireless node 60 or a home access point 70 similarly equipped are the same as discussed above. A flow chart for preventing an attack on a wireless node 60 by an attacker 75 impersonating as an access point 70 is shown in FIG. 4. In Block 120, the wireless node 60 verifies if the attacker 75 has an allowed authentication token. If no, the attack fails in Block 122 by the wireless node 60 rejecting an association attempt. If yes, the wireless node 60 verifies in Block 124 if the attacker 75 has an allowed MAC address. If no, the attack fails in Block 126 by the wireless node 60 rejecting the authorization token without an allowed MAC address. If yes, the wireless node 60 verifies in Block 128 if the attacker 75 is trying to attack near the legitimate access point 70. If yes, the legitimate access point 70 can hear the attacker and trigger an alert in Block 130 so that the attack fails. If no, the wireless node 60 rejects the association attempt outside the designated are in Block 132 and the attack fails.

Figure 5:
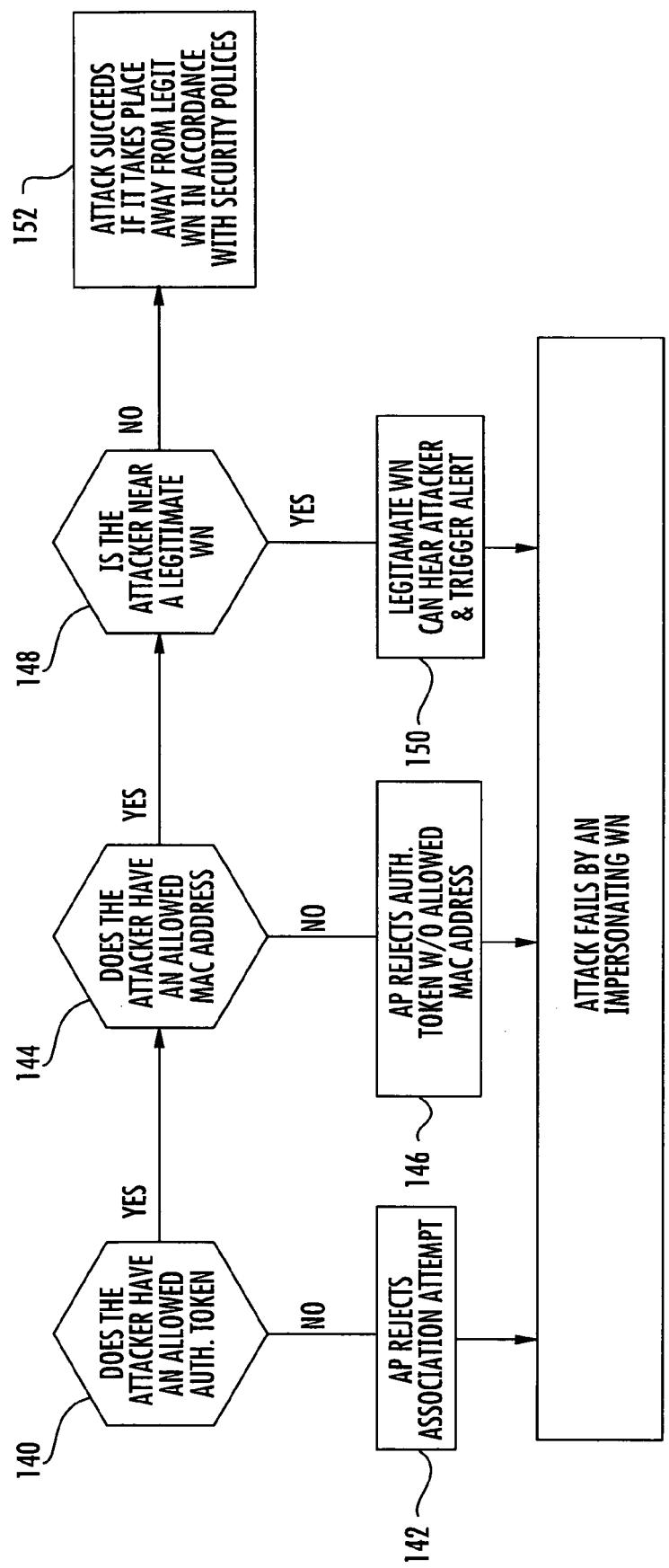
FIG. 5 is a flow chart for preventing an attack on an access point by an attacker impersonating as a wireless node in accordance with the present invention.

A flow chart for preventing an attack on an access point 70 by an attacker 65 impersonating a wireless node 60 is shown in FIG. 5. In Block 140, the access point 70 verifies if the attacker 65 has an allowed authentication token. If no, the attack fails in Block 142 by the access point 70 rejecting an association attempt If yes, the access point 70 verifies in Block 144 if the attacker 65 has an allowed MAC address. If no, the attack fails in Block 146 by the access point 70 rejecting the authorization token without an allowed MAC address. If yes, the access point 70 verifies in Block 148 if the attacker 65 is trying to attack near a legitimate wireless node 60. If yes, the legitimate wireless node 60 can hear the attacker and trigger an alert in Block 150 so that the attack fails. If no, an attack can only be successful in Block 152 if it takes place away from a legitimate wireless node 60 in accordance with the security policies of the wireless communications network 50.

Another aspect of the present invention is directed to a method for detecting impersonating attacks in a wireless communications network 50 as defined above. The method comprises wirelessly transmitting packets from the access points 70 to the wireless nodes 60. Each packet comprises an authentication token, an origination address and a destination address.

Each wireless node 60 reads and stores the respective authentication tokens and origination addresses of each access point 70 for defining an allowed access point list 62. Each wireless node 60 wirelessly transmits packets to the access points 70, where each packet may comprise an authentication token, an origination address and a destination address. Each access point 70 reads and stores the respective authentication tokens and origination addresses of the wireless nodes for defining an allowed wireless node list 72, The wireless nodes 60 do not associate with an access point 70 if both an authentication token and an address associated therewith are not on the allowed access point list 62, and the access points do not associate with a wireless node if both an authentication token and an address associated therewith are not on the allowed wireless node list 72.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications network comprising:
   at least one access point having a respective authentication token and address associated therewith;
   a plurality of wireless nodes for communicating with said at least one access point, each wireless node having a respective authentication token and address associated therewith;
   said at least one access point and said plurality of wireless nodes communicating using packets, each packet comprising an authentication token, an origination address and a destination address; and
   during the communicating, said at least one access point reading and storing the respective authentication tokens and origination addresses for each received packet that was wirelessly transmitted from said plurality of wireless nodes for defining an allowed wireless node list;
   during the communicating, each wireless node reading and storing the respective authentication tokens and origination addresses for each received packet that was wirelessly transmitted from said at least one access point for defining an allowed access point list;
   said at least one access point monitoring packets being wirelessly transmitted within the wireless communications network by reading the originating addresses of each transmitted packet, and when a read origination address matches the address of said at least one access point, and said at least one access point did not transmit the packet, then a determination is made by said at least one access point that an attacker is impersonating said at least one access point; and
   said at least one access point transmits a warning message by increasing its transmits power to drown out transmission by the attacker.

2. A wireless communications network according to claim 1 wherein anyone of said plurality of wireless nodes does not associate with an access point when both an authentication token and an origination address for that access point are not on the allowed access point list.

3. A wireless communications network according to claim 1 wherein said at least one access point does not associate with anyone of said plurality of wireless nodes when both an authentication token and an origination address for that wireless node are not on the allowed wireless node list.

4. A wireless communications network according to claim 1 wherein said at least one access point switches to another communications channel when the attacker is impersonating said at least one access point.

5. A wireless communications network according to claim 1 wherein said at least one access point notifies a network administrator when the attacker is impersonating said at least one access point.

6. A wireless communications network according to claim 1 wherein each wireless node monitors packets being wirelessly transmitted within the wireless communications network by reading the originating addresses of each transmitted packet, and when a read origination address matches the address of said wireless node performing the monitoring, and said wireless node did not transmit the packet, then a determination is made by the wireless node that an attacker is impersonating said wireless node.

7. A wireless communications network according to claim 6 wherein said wireless node switches to another communications channel when the attacker is impersonating said wireless node.

8. A wireless communications network according to claim 6 wherein said wireless node transmits a warning message by increasing its transmits power to drown out transmission by the attacker when the attacker is impersonating said wireless node.

9. A wireless communications network according to claim 6 wherein said wireless node notifies a network administrator when the attacker is impersonating said wireless node.

10. A wireless communications network according to claim 1 wherein said at least one access point has identifying information associated therewith, and when one of said plurality of wireless nodes is associating with said at least one access point, said wireless node displays the identifying information to a user of the wireless node.

11. A wireless communications network according to claim 10 wherein the identifying information corresponds to the authentication token of said at least one access point.

12. A wireless communications network according to claim 1 further comprising an authentication server coupled to said at least one access point so that the wireless communications network is configured as an authenticated network.

13. A wireless communications network according to claim 1 wherein said at least one access point and said plurality of wireless nodes are operating based upon at least one of a PSK protocol and an 802.1x protocol.

14. A wireless communications network according to claim 1 wherein the addresses comprise MAC addresses.

15. A method for detecting impersonating attacks in a wireless communications network comprising at least one access point and a plurality of wireless nodes, the at least one access point and each wireless node having a respective authentication token and address associated therewith, the method comprising:
   wirelessly transmitting packets from the at least one access point to the plurality of wireless nodes, each packet comprising an authentication token, an origination address and a destination address;
   reading and storing by each wireless node the respective authentication tokens and origination addresses for each received packet from each access point for defining an allowed access point list;
   wirelessly transmitting packets from the plurality of wireless nodes to the at least one access point, each packet comprising an authentication token, an origination address and a destination address;
   reading and storing by the at least one access point the respective authentication tokens and origination addresses for each received packet for the plurality of wireless nodes for defining an allowed wireless node list; and
   operating the at least one access point to monitor packets being wirelessly transmitted within the wireless communications network by reading the originating addresses of each transmitted packet, and when a read origination address matches the address of the at least one access point, and the at least one access point did not transmit the packet, then a determination is made by the at least one access point that an attacker is impersonating the at least one access point, and the at least one access point transmits a warning message by increasing its transmits power to drown out transmission by the attacker.

16. A method according to claim 15 wherein anyone of the plurality of wireless nodes does not associate with an access point when both an authentication token and an origination address of that access point are not on the allowed access point list.

17. A method according to claim 15 wherein the at least one access point does not associate with anyone of the plurality of wireless nodes when both an authentication token and an origination address of that wireless node are not on the allowed wireless node list.

18. A method according to claim 15 wherein the at least one access point switches to another communications channel when the attacker is impersonating the at least one access point.

19. A method according to claim 15 wherein the at least one access point notifies a network administrator when the attacker is impersonating the at least one access point.

20. A method according to claim 15 wherein each wireless node monitors packets being wirelessly transmitted within the wireless communications network by reading the originating addresses of each transmitted packet, and when a read origination address matches the address of the wireless node performing the monitoring, and the wireless node did not transmit the packet, then determining that an attacker is impersonating the wireless node.

21. A method according to claim 20 wherein the wireless node switches to another communications channel when the attacker is impersonating the wireless node.

22. A method according to claim 20 wherein the wireless node transmits a warning message by increasing its transmit power to drown out transmission by the attacker when the attacker is impersonating the wireless node.

23. A method according to claim 20 wherein the wireless node notifies a network administrator when the attacker is impersonating the wireless node.

24. A method according to claim 15 wherein the at least one access point has identifying information associated therewith, and when one of the plurality of wireless nodes is associating with the at least one access point, the wireless node displays the identifying information to a user of the wireless node, with the identifying information corresponding to the authentication token of the at least one access point.

25. A method according to claim 15 wherein the wireless communications network further comprises an authentication server coupled to the at least one access point so that the wireless communications network is configured as an authenticated network.

26. A method according to claim 15 wherein the at least one access point and the plurality of wireless nodes are operating based upon at least one of a PSK protocol and an 802.1x protocol, and wherein the addresses comprise MAC addresses.

* * * * *

UNITED STATES PATENT AND TRADEMARK OFFICE
CERTIFICATE OF CORRECTION

PATENT NO. : 8,139,521 B2  
APPLICATION NO. : 11/553293  
DATED : March 20, 2012  
INVENTOR(S) : Mukherjee et al.

Page 1 of 1

It is certified that error appears in the above-identified patent and that said Letters Patent is hereby corrected as shown below:

| | |
|---|---|
| Column 2, Line 17 | Delete: "products The"<br>Insert: -- products. The -- |
| Column 2, Line 34 | Delete: "If an attacker is impersonating a wireless node, several actions may be taken by the wireless node. The wireless node may switch to another communications channel, transmit a warning message by increasing its transmits power to drown out transmission by the attacker, or notify a network administrator." |
| Column 2, Line 63 | Delete: "address Each"<br>Insert: -- address. Each -- |
| Column 4, Line 22 | Delete: "attacker This"<br>Insert: -- attacker. This -- |
| Column 4, Line 59 | Delete: "concept A"<br>Insert: -- concept. A -- |
| Column 5, Line 37 | Delete: "with For"<br>Insert: -- with. For -- |
| Column 6, Line 39 | Delete: "attempt If"<br>Insert: -- attempt. If -- |
| Column 6, Line 66 | Delete: "72 The"<br>Insert: -- 72. The -- |

Signed and Sealed this  
Tenth Day of July, 2012

David J. Kappos  
*Director of the United States Patent and Trademark Office*